United States Patent [19]

Kayaert et al.

[11] Patent Number: 5,653,781
[45] Date of Patent: Aug. 5, 1997

[54] PROCESS FOR THE PRODUCTION OF UREA GRANULES

[75] Inventors: Andre Firmin Kayaert, Overijse; Roger Alfons Camille Antonus, Boortmeerbeek, both of Belgium

[73] Assignee: Hydro Agri Sluiskil B.V., HJ Sluiskil, Netherlands

[21] Appl. No.: 381,851

[22] PCT Filed: Aug. 5, 1993

[86] PCT No.: PCT/NL93/00167

§ 371 Date: May 25, 1995

§ 102(e) Date: May 25, 1995

[87] PCT Pub. No.: WO94/03267

PCT Pub. Date: Feb. 17, 1994

[30] Foreign Application Priority Data

Aug. 7, 1992 [ID] Indonesia .................. P-004539

[51] Int. Cl.⁶ .................................................. C05C 9/00
[52] U.S. Cl. .................. 71/28; 71/64.05; 71/64.06
[58] Field of Search .................. 71/28, 64.05, 64.06

[56] References Cited

U.S. PATENT DOCUMENTS

| | | |
|---|---|---|
| 3,067,177 | 12/1962 | Greco et al. |
| 3,112,343 | 11/1963 | Allgeuer et al. |
| 4,217,127 | 8/1980 | Kono et al. ............... 71/28 |
| 4,219,589 | 8/1980 | Niks et al. ............... 427/213 |
| 4,619,843 | 10/1986 | Mutsers ............... 71/64.06 |
| 4,701,353 | 10/1987 | Mutsers et al. ............... 71/64.06 |

FOREIGN PATENT DOCUMENTS

| 0212714 | 3/1987 | European Pat. Off. |
|---|---|---|
| 998446 | 2/1983 | U.S.S.R. |

*Primary Examiner*—Steven Bos
*Attorney, Agent, or Firm*—Wenderoth, Lind & Ponack

[57] ABSTRACT

A process for the production of urea granules from a melt or solution of urea by spraying the urea melt or solution, which also contains as granulation additive formaldehyde, methylolureum, urea-formaldehyde precondensates, or hexamethylenetetramine, in the form of very fine droplets into a fluidized bed of urea particles, in which process the granulation additive is added to the melt or solution prior to the granulation at such a stage so that the mixture of the granulation additive and the urea melt or solution has a contact time of at least 20 sec., but not more than 20 min.

16 Claims, 1 Drawing Sheet

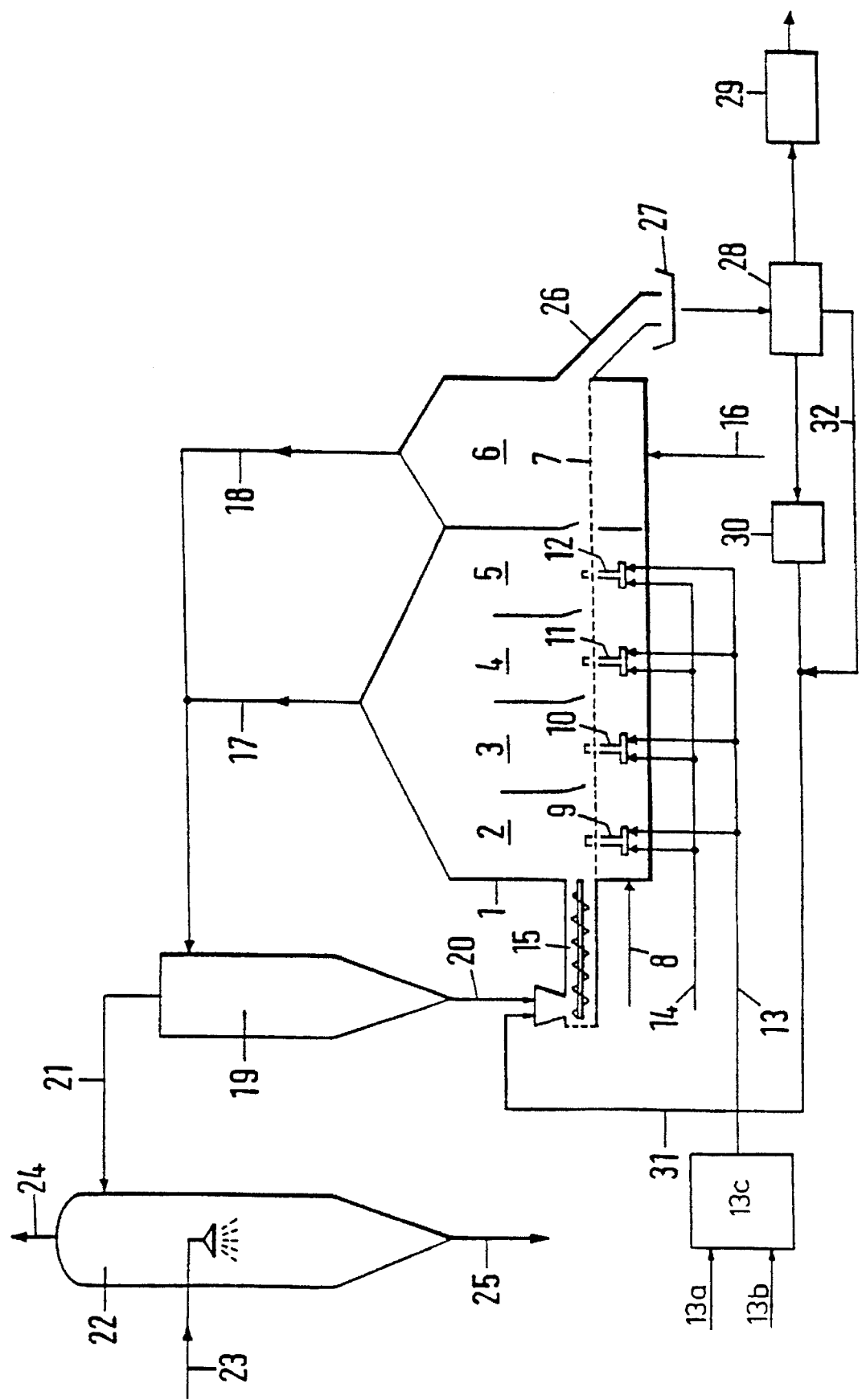

PROCESS FOR THE PRODUCTION OF UREA GRANULES

BACKGROUND OF THE INVENTION

For the production of urea granules various methods are known. In the past prilling was the predominant method, wherein a substantially anhydrous urea melt (having a water content of no more than 0.1 to 0.3% by weight) is sprayed from the top of a prilling column in a rising stream of air of ambient temperature in which the droplets solidify to form so-called prills. These prills have a relatively small maximum diameter and are mechanically rather weak.

Urea granules having larger dimensions and better mechanical properties are presently being produced by the granulation of a substantially anhydrous urea melt or of an aqueous urea solution in a fluidized bed, for example as described in U.S. Pat. No. 4,219,589. In the process described therein, an aqueous urea solution having a urea concentration of 70–99.9% by weight, preferably 85–96% by weight, is sprayed in the form of very fine droplets having an average diameter of 20–120 μm into a fluidized bed of urea particles at a temperature at which the water evaporates from the solution sprayed onto the particles, and urea solidifies on the particles to form granules having a desired size which my be 2.5 mm and more. As in this process rather large amounts of fly dust are formed, especially if the urea solution used as the starting material contains more than 5% by weight of water, in particular more than 10% by weight of water, preferably a crystallization retarder or granulation additive for the urea, in particular a water-soluble addition or condensation product of formaldehyde and urea, is added to the urea solution, whereby the formation of fly dust is considerably lower, or even suppressed. The result of the presence of the granulation additive is that the granules remain plastic as they are being formed, so that owing to rolling and/or impacts during the formation mechanically strong, smooth and round granules may be formed.

The resulting granules have a high crushing strength, a high impact resistance, and little tendency of forming fly dust through abrasion, and moreover do not cake together, not even upon prolonged storage, although urea exhibits a strong natural tendency of caking together.

Although the process of the cited U.S. patent specification resulted in large improvement in the properties of the urea granules, further improvement was still found to be necessary, especially with respect to the amount of fly dust of the final product and the dust formation during granulation.

SUMMARY OF THE INVENTION

The object of the present invention is to provide a process for the production of urea granules by a granulation technique, preferably as described in U.S. Pat. No. 4,219,589, wherein the amount of dust formed during granulation is reduced, as well as the amount of fly dust of the end product.

The invention is directed to a process for the production of urea granules from a melt or solution of urea by spraying the urea melt or solution, which also contains as granulation additive formaldehyde, methylolureum, formurea, or hexmethylenetetramine, in the form of very fine droplets into a fluidized bed of urea particles, in which process the granulation additive is added to the melt or solution prior to the granulation at such a stage 50 that the mixture of the said granulation additive and the urea melt or solution has a contact time of at least 20 sec., but not more than 20 min.

Surprisingly it has been found that by adding the granulation additive at such a stage that the mixture of granulation additive and urea has a specified residence time, an improved process and an improved product are obtained.

More specifically the process is much more economic due to the reduced amount of dust in the granulation. This reduces the amount of liquid to be used for washing the gas from the granulator, and consequently the amount of steam for evaporating the water from said urea solution.

Also, the dust from abrasion of the end product is reduced considerably, which is an important advantage for further material handling.

The optimum value for the contact time depends on various factors, such as the water content of the urea melt or solution, the temperature, the amount of granulation additive and the chemical formulation of the additive.

More in particular it is observed that with shorter contact times the effect of reduced dust formation and fly dust is not obtained. With residence times longer than 20 min the amounts of biuret and triuret tend to become prohibitively high.

Preferably the contact time is between 25 sec. and 20 min, as within this range the optimum results are obtained.

Preferred granulation additives are formaldehyde and water-soluble addition and/or condensation produces of formaldehyde and urea. The production of water-soluble addition products of formaldehyde and urea is known, for example, from U.S. Pat. No. 3,067,177 and the production of water-soluble condensation products of formaldehyde and urea is disclosed in U.S. Pat. No. 3,112,343. It is also possible to use addition products of formaldehyde and urea produced in the first place in an alkaline medium and then condensed in an acid medium to form thin-liquid to syrupy liquids, such as the liquid adhesives used in the chipboard industry.

The process of the present invention can be applied in a conventional urea production and granulation unit, for example such as described in U.S. Pat. No. 4,219,589.

BRIEF DESCRIPTION OF THE DRAWING

The drawing illustrates an apparatus which can be used to carry out the process of the instant invention.

DESCRIPTION

In the operation of the process of the invention a synthesis solution of urea is obtained from a urea plant, which synthesis solution, optionally after concentration to the required water content, is mixed with the granulation additive, preferably in amount of 0.3 to 0.8 wt. %, calculated as formaldehyde, based upon the weight of the final granules.

This mixing can be done an any stage of the process, provided care is taken than the required contact time is provided. If necessary it is possible to include a separate, buffer vessel after a mixing device and prior to the fluidized bed. Alternatively the granulation additive can be added prior no the evaporation of water from the urea solution, provided that care is taken to remain within the range of the contact time.

It has further been found that the process of the present invention in a build-up of the granules which proceeds flawlessly, whereby also the formation of fly dust is prevented, while in addition the resulting urea granules have a very high crushing strength and a very high apparent specific density. A further feature is that the urea granules produced according to the invention do not cake together, not even upon prolonged storage.

Preferably the additive is used in a quantity corresponding to 0.3–0.8% by weight of formaldehyde, calculated on the final product. If desired, higher ratios may be used, but this does not offer any particular advantages. The additive may be added in any suitable form, but preferably as a concentrated aqueous solution, whereby the concentration ranges from 30 to 85 wt. %.

Preferably, after their formation the granules are cooled to a temperature compatible with the ambient air conditions, e.g. to about 40°–45° C. for tropical or to about 30° C. for moderate climatic conditions, for example by means of a stream of air, the moisture content of which has preferably been reduced to such an extent that during the cooling process the granules do not absorb moisture from the cool air.

The urea granules produced in accordance with the present invention can advantageously be used in combination with superphosphate and triple superphosphate. In addition other components can be combined therewith, such as a potassium fertilizer (usually KCl).

The granulation of urea can be carried, out by spraying an aqueous solution on to fluidized urea nuclei, said solution having a urea concentration of 70–99.9% by weight. The use of a solution having a urea concentration of 85–96% by weight is preferred.

The urea solution is sprayed with a gas, such as air. Preferably the solution is sprayed within the fluidized bed of urea nuclei, as spraying on to the bed involves the risk of the sprayed droplets being entrained by the fluidization air issuing from the bed. The pressure of the spraying air is preferably 118–392 kPa (1.2–4 atmospheres absolute). This pressure has a highly important effect on the size of the sprayed droplets. The higher the pressure, the smaller are the sprayed droplets. The mean drop diameter is preferably between 25 and 250 μm.

The size of the urea nuclei sullied to the fluidized bed in which the granulation takes place generally ranges between 0.2 and 3 mm, but may be larger when larger urea granules are to be made.

The temperature of the fluidized bed of urea nuclei generally range between 70° and 115° C., preferably between 80° and 110° C. Within these limits, the temperature may be lower as the urea concentration of the solution sprayed on to the nuclei is higher. The temperature of the fluidized bed can be controlled by a suitable selection of the temperature of the fluidization air and of the concentration of the urea solution being sprayed.

The urea solution is sprayed over the urea nuclei in the form of very fine droplets. Under the influence of the temperature prevailing in the fluidized bed, the water is evaporated from the solution and the urea crystallizes on the surface of the urea nucleus. Owing to the small size of the droplet these will generally be able to cover a portion of the surface of the individual urea nuclei only. This prevents formation of an onion-like structure of the granules, in which the nucleus is coated in succession with essentially superimposed layers. As a consequence, the granules according to the present invention do not exhibit the stresses inherent in an onion-like structure. It is considered that the excellent mechanical properties of the urea granules according to this invention are due to the absence of these stresses. A further advantage of the minute drop size of the sprayed urea solution is that the water can be fully evaporated from it in a short time.

The product produced by the process according to the present invention contains only small .quantities of free $NH_3$, $CO_2$, moisture and biuret and has such mechanical properties that it is suitable for pneumatic transportation, and remains free flowing even after prolonged storage. A particular advantage of the process according to the invention is that the formation of biuret during the granulation is prevented almost entirely. Thus by spraying a urea solution having a urea content of for example, 75–85% by weight and a biuret content of less than 0.1%, urea granules with a biuret content of less than 0.1% can be obtained.

The urea granules produced by the process of this invention are highly suitable for being coated with, for example, sulphur, to form slow-release granules, as, owing to their excellent sphericity and their closed surface, the required amount of coating material is minimized.

The process according to the present invention can be carried out in any type of fluid-bed granulator. One example of a suitable apparatus is diagrammatically shown in the accompanying drawing, which shows a granulator 1 divided into a plurality of compartments 2, 3, 4 and 5 for the granulation, and subsequent compartment 6 for the subsequent cooling and drying of the urea granules. Granulator 1 comprises a grid 7, which supports the fluidized bed and transmits the air of fluidization, optionally preheated in one or more heaters not shown and supplied through conduit 8. The space below the grid can be divided in the same way as the space above it, into compartments, in which case the air of fluidization is supplied to each of these compartments. Granulator 1 is further provided at the bottom with pneumatic sprayer systems 9, 10, 11 and 12, which extend to a level above grid 7. It is also possible to use two or more sprayer systems in each compartment. Through these sprayers, the urea solution supplied through conduit 13, to which a granulation additive has been added, is sprayed with the atomization air supplied through conduit 14 into the granulation compartments 2, 3, 4 and 5. The urea solution is introduced into buffer vessel 13c via line. 13a. At the same time the granulation additive is introduced in the buffer vessel via line 13b. The dimensions of the buffer vessel are such that a sufficient contact is guaranteed. The fluidized bed is constituted by urea nuclei. For the subsequent conditioning, cooling and optional drying of the granules in compartment 6, granulator 1 is equipped with a conduit 16 for supplying air.

For the removal of air and possibly entrained dust particles, granulator 1 has discharge conduits 17 and 18, which are connected to a cyclone 19, in which very small granules are separated, which are supplied through conduit 20 to screw conveyor 15. The air from cyclone 19 is conducted through discharge conduit 21 to a device 22, in which the air is washed with a dilute urea solution to remove fine dust and possibly remaining very small granules. In order that a high washing efficiency may be achieved, water may be sprayed into the air through a sprayer 23. The air stripped of dust can escape through discharge conduit 24, and the dilute urea solution formed is discharged through conduit 25.

Granulator 1 further comprises a bottom outlet 26 for urea granules, terminating over a vibratory chute 27, whence the granules are transported to a screening device 28, in which they are separated into a number of fractions, namely into an undersize fraction, a fraction having the desired sizes, and an oversize fraction. The fraction having the desired sizes is optionally passed through a cooler 29 to a storage site, where further separation into fractions for different purposes can be effected. If desired, the cooler may be arranged upstream of the sieving device. The fraction of oversize granules separated in sieving device 28 is transported to a crusher 30 in which this fraction is crushed to the required size to serve as fresh nuclei. The undersize fraction separated in sieving device 28 is passed through conduit 32 to conduit 31, together with the fraction from crusher 30 to be returned to the granulator 1.

The quantity of urea granules removed from the system to the storage is replaced by fresh urea nuclei from the crusher.

The size of the product granules depends on a number of factors, such as the number of urea nuclei in the fluidized bed, the size of these nuclei, the quantity of urea solution sprayed per unit of time, and the residence time of the nuclei in the bed. Thus, for example, larger product granules will be obtained, if the number of nuclei in the fluidized bed is reduced and the residence time is prolonged. In order that a predetermined particle size distribution of the product may be maintained, it is necessary for the bed contents to be kept as constant as possible as regards both the particle size distribution and the number of nuclei. This can be achieved by ensuring that the quantity by weight of the urea nuclei, with the correct particle size distrubition, to be added to the fluidized bed is at all times in agreement with the quantity by weight of the product granules removed from the bed.

If, through one cause or another, deviations in the desired product sizes occur during the granulation process, these deviations will be automatically corrected in the above-described embodiment of the process: if the product becomes too coarse, a larger oversize fraction will be separated in sieving device 28, the load of crusher 30 will be increased, and a larger number of nuclei will be supplied through line 31 to the fluidized bed in granulator 1, whereby the average diameter of the granules is reduced. The operation of crusher 30 should be properly controlled: if the broken product is too fine, too much dust is supplied to the fluidized bed, where it is either entrained by the fluidization gas, or causes agglomaration; if the broken product is too coarse, too few nuclei are supplied to the fluidized bed.

The invention is illustrated in and by the following examples.

EXAMPLES

In an installation as described in the FIGURE 1700 t/d urea was granulated. To the urea a granulation additive based on a urea/formaldehyde condensate was added in an amount corresponding to 0.50 wt. % of $CH_2O$, calculated on the final product. The contact time of the granulation additive and the urea melt was varied. In the table the results of the various experiments are reported.

TABLE

|  | 1 | 2 | 3 | 4 | 5 | 6 | 7 | 8 |
|---|---|---|---|---|---|---|---|---|
| contact time (sec.) | 10 | 10 | 30 | 30 | 600 | 600 | 30 | 30 |
| crushing strength (diam. 2.5; kg) | 2.6 | 2.5 | 2.3 | 2.7 | 2.6 | 2.3 | 2.8 | 2.5 |
| Density ($kg/m^3$) | 1.232 | 1.232 | 1.245 | 1.247 | 1.246 | 1.239 | 1.247 | 1.24 |
| Abrasion (Dust; g/kg) | 8.0 | 5.1 | 3.5 | 3.0 | 1.3 | 2.0 | 4.3 | 3.0 |

We claim:

1. A process for the production of urea granules from a melt or solution of urea by spraying the urea melt or solution, which also contains as granulation additive formaldehyde, methylolureum, urea-formaldehyde condensation products, or hexamethylenetetramine, in the form of very fine droplets into a fluidized bed of urea particles, in which process the granulation additive is added to the melt or solution for a contact time of 20 seconds, but not more than 20 min, prior to the spraying.

2. The process according to claim 1, wherein the contact time is between 25 seconds and 20 min.

3. The process of claim 1, wherein the amount of granulation additive is between 0.3 and 0.8 wt. % calculated as formaldehyde based upon the weight of the urea granules.

4. The process according to claim 1, wherein the required contact time is provided by the presence of a buffer vessel between a mixing unit and the fluidized bed.

5. The process according to claim 1, wherein the required contact time is provided by adding the granulation additive to an urea solution prior to the evaporation of water therefrom to provide the melt or solution to be granulated.

6. The process according to claim 1, wherein the size of the very fine droplets is between 25 and 250 μm.

7. The process of claim 2, wherein the amount of granulation additive is between 0.3 and 0.8 wt. % calculated as formaldehyde based upon the weight of the urea granules.

8. The process according to claim 2, wherein the required contact time is provided by the presence of a buffer vessel between a mixing unit and the fluidized bed.

9. The process according to claim 3, wherein the required contact time is provided by the presence of a buffer vessel between a mixing unit and the fluidized bed.

10. The process according to claim 2, wherein the required contact time is provided by adding the granulation additive to an urea solution prior to the evaporation of water therefrom to provide the melt or solution to be granulated.

11. The process according to claim 3, wherein the required contact time is provided by adding the granulation additive to an urea solution prior to the evaporation of water therefrom to provide the melt or solution to be granulated.

12. The process according to claim 4, wherein the required contact time is provided by adding the granulation additive to an urea solution prior to the evaporation of water therefrom to provide the melt or solution to be granulated.

13. The process according to claim 2, wherein the size of the very fine droplets is between 25 and 250 μm.

14. The process according to claim 3, wherein the size of the very fine droplets is between 25 and 250 μm.

15. The process according to claim 4, wherein the size of the very fine droplets is between 25 and 250 μm.

16. The process according to claim 5, wherein the size of the very fine droplets is between 25 and 250 μm.

* * * * *